United States Patent [19]

Petry

[11] 4,128,050

[45] Dec. 5, 1978

[54] BEVERAGE BREWER STRUCTURE

[75] Inventor: Stanton H. Petry, Arlington Heights, Ill.

[73] Assignee: Cory Food Services, Inc., Chicago, Ill.

[21] Appl. No.: 661,843

[22] Filed: Feb. 27, 1976

[51] Int. Cl.² .................... A47J 31/00; A23F 1/08
[52] U.S. Cl. ........................................ 99/304; 99/288
[58] Field of Search .............. 99/304, 279, 280–281, 99/282, 284, 288, 290, 296, 300, 304, 306–307, 316

[56] References Cited

U.S. PATENT DOCUMENTS

| | | | |
|---|---|---|---|
| 3,122,987 | 3/1964 | Ruhnke | 99/290 |
| 3,218,955 | 11/1965 | Lorang | 99/281 X |
| 3,332,337 | 7/1967 | Lowry | 99/282 |
| 3,336,856 | 8/1967 | Martin | 99/288 |
| 3,354,810 | 11/1967 | Lorang | 99/282 |
| 3,412,672 | 11/1968 | Herbsthofer | 99/300 |

Primary Examiner—Philip R. Coe
Assistant Examiner—Arthur O. Henderson
Attorney, Agent, or Firm—Wegner, Stellman, McCord, Wiles & Wood

[57] ABSTRACT

A beverage brewer structure wherein a warmer station is selectively utilizable separately or in mounted association with the beverage brewing apparatus. The brewing apparatus may include a removable cover which may be secured to the brewing apparatus by a suitable securing structure. When the warmer station is mounted to the brewing apparatus, the securing structure is utilized to jointly secure the warming station to the cover and the cover to the beverage brewing apparatus. When so installed, the securing structure is hidden within the warming station by a removable portion of the warming station.

9 Claims, 3 Drawing Figures

U.S. Patent  Dec. 5, 1978  4,128,050
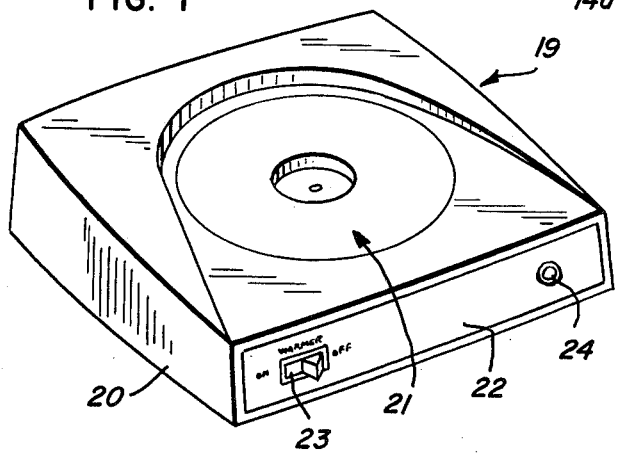
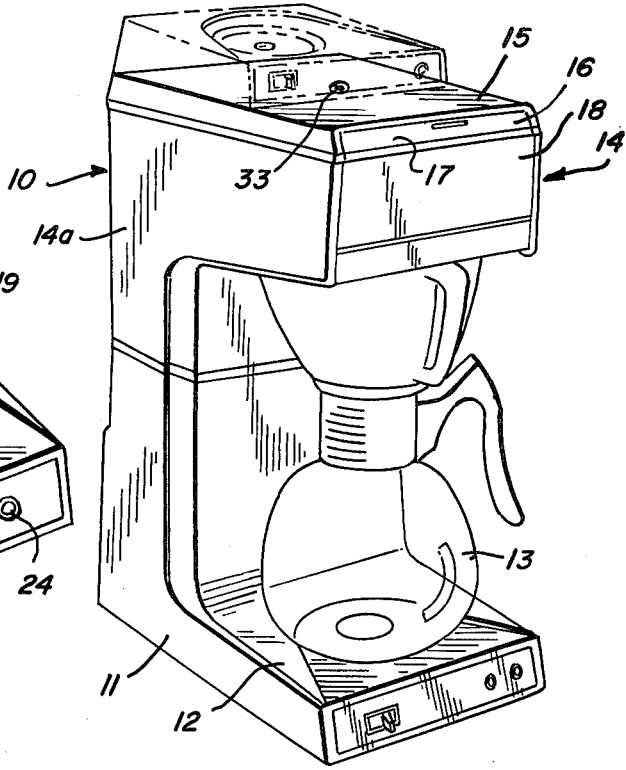
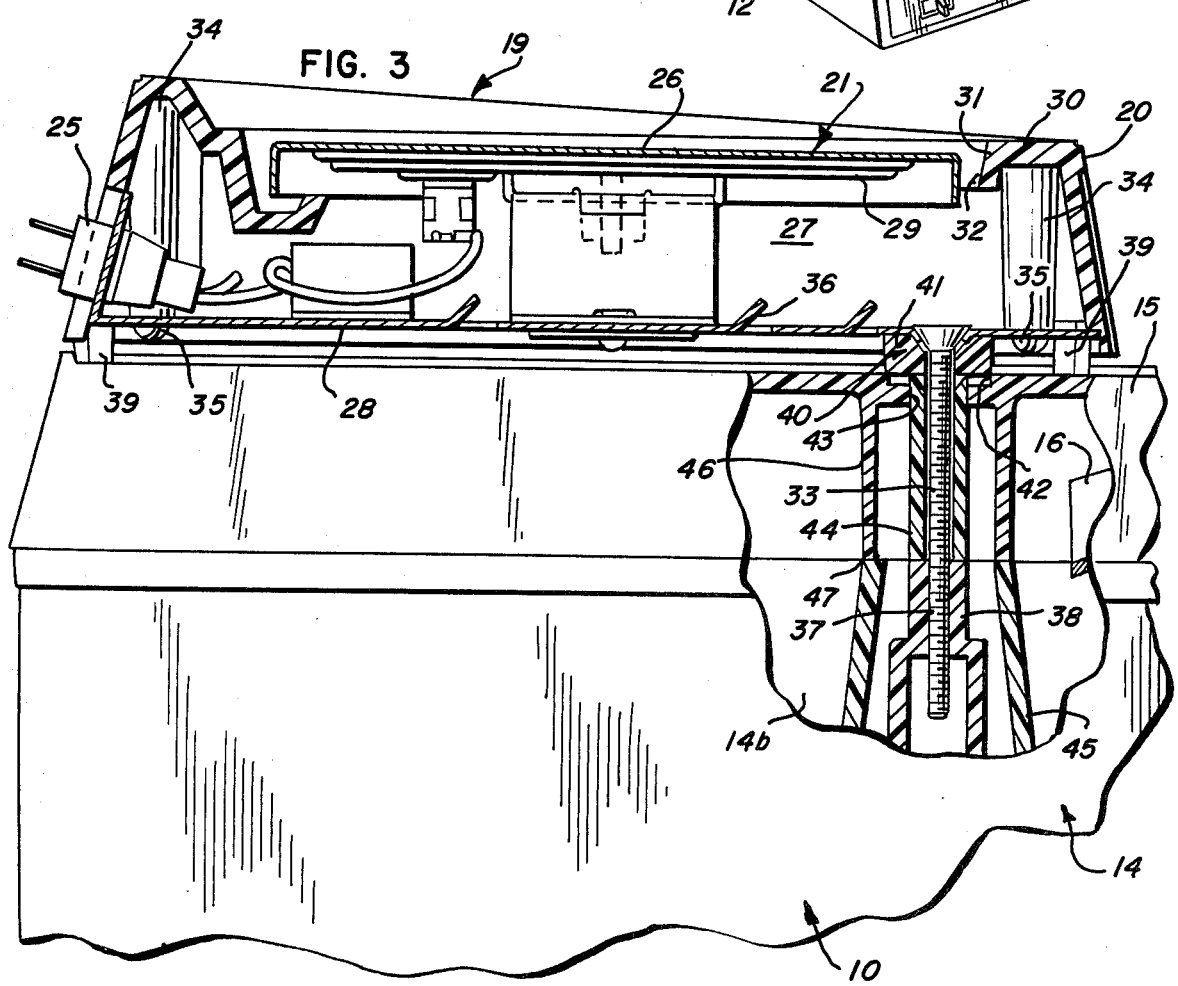

BEVERAGE BREWER STRUCTURE

BACKGROUND OF THE INVENTION

1. Field of the Invention

This invention relates to beverage brewing structure and in particular to warmer station means for use in connection with the brewing and serving of beverages, such as coffee.

2. Description of the Prior Art

In the dispensing of brewed beverages, such as coffee, it is desirable to maintain the brewed beverage at serving temperature over a period of time such as where the brewed beverage is provided in a decanter or the like. To effect such maintained warming, warming stations are provided having heater means for heating the decanter suitably to maintain the beverage therein at the desired serving temperature.

An example of such a heating means mounted in a beverage brewing apparatus is shown in U.S. Pat. No. 3,589,273 of Harvey R. Karlen, owned by the assignee hereof.

In the beverage brewing apparatus disclosed in the Karlen patent, the apparatus includes a housing structure having a warmer station in a forwardly projecting lower portion thereof for carrying a decanter below a brewing cartridge removably mounted to an upper portion of the cabinet. Hot water is provided from a heating tank within the cabinet, being delivered therefrom as the result of the delivery of cold water to an upper basin within the cabinet displacing hot water from the heating tank to the brewing cartridge.

A cover is provided overlying the basin for providing controlled access to the basin when desired.

It is further conventional to provide warmer stations independently of the beverage brewing apparatuses. Illustratively, such warmer stations may be located in different locations within a restaurant for maintaining previously brewed coffee at serving temperature.

SUMMARY OF THE INVENTION

The present invention comprehends an improved warmer station which is adapted for selective separate operation remotely of the beverage brewing apparatus, or alternatively, as a warmer station mounted to the beverage brewing apparatus.

More specifically, the invention comprehends providing such a warmer station which may be selectively mounted to a top wall, or cover, of the brewing apparatus. In the illustrated embodiment, the cover is removably secured to the brewing apparatus by a securing means which, when the warmer station is mounted to the brewing apparatus, further serves to secure the warming apparatus to the cover.

In the illustrated embodiment, the securing means may engage a connecting portion disposed within the brewing apparatus cabinet. More specifically, in the illustrated embodiment the securing means includes a female threaded portion forming a portion of the basin adapted to receive a male securing element extending downwardly through the cover and also downwardly through a bottom wall portion of the warmer station when the warmer station is installed on the brewing apparatus.

The warmer station may be provided with depending supports for supporting the bottom wall above a flat surface on which the warmer station is placed. The securing means may include a spacer extending between the bottom wall and the cover for improved facilitated mounting of the warmer station to the cover in the assembled relationship thereof.

Thus, the beverage brewer structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a perspective view of a warmer station embodying the invention;

FIG. 2 is a perspective view of a beverage brewing structure with the warmer station shown installed thereon in dotted lines; and FIG. 3 is a fragmentary vertical section of the warmer station mounted on the beverage brewing apparatus with a portion of the beverage brewing apparatus broken away to illustrate the securing of the warmer station thereto.

DESCRIPTION OF THE PREFERRED EMBODIMENT

In the exemplary embodiment of the invention as disclosed in the drawing, a beverage brewing apparatus generally designated 10 is shown to comprise a beverage brewing apparatus having a base portion 11 provided with a warmer station 12 for carrying a decanter 13 and maintaining beverage therein, such as coffee, at a preselected serving temperature.

The beverage brewing apparatus further includes an upper portion 14 defining a heating tank 14a and an upwardly opening basin 14b which is selectively closed by an overlying cover 15. In the illustrated embodiment, the cover is provided with a drawer 16 which extends into the basin, delivering cold water into the basin when the drawer is moved forwardly to an exposed position. As shown in FIG. 2, in the retracted position, the drawer front 17 is flush with the front wall 18 of the cabinet portion 14.

The present invention is concerned with the provision of a warmer section generally designated 19 adapted for use separably from the brewer 10, or as a component thereof, as desired. As shown in FIG. 1, the warmer station 19 comprises a low profile housing 20 having an upwardly facing heating element 21. The housing includes a front wall 22 carrying a control switch 23 and a signal light 24 for indicating the energization of the heater 21.

As shown in FIG. 3, the warmer station 19 may be provided with suitable electrical connector wiring 25 for connecting the warmer station to a suitable source of electrical energy.

The heater 21 may include a removable cover 26 which, when removed, provides controlled access to the space 27 within the warmer station housing 20, as best seen in FIG. 3. As further seen in FIG. 3, the housing 20 opens downwardly and is provided with a removable bottom wall 28 which may be formed of a suitable fire-resistant material, such as metal, and which carries the heater coil 29 in spaced relationship to the top wall 30 of the housing 20 to be spaced inwardly of the peripheral wall 31 defining an upper opening 32 in the top wall.

As best seen in FIG. 2, the cover 15 may be secured to the beverage brewer cabinet 11 by a suitable screw 33. As shown in FIG. 3, the housing is provided with a plurality of depending posts 34 extending downwardly to the bottom wall 28 for receiving screws 35 to secure the bottom wall to the housing. The bottom wall may further be provided with a plurality of louver openings 36 for conducting air upwardly through the bottom wall to the heating unit 29.

When it is desired to mount the warmer station to the brewing apparatus, the warmer station may be superposed on the cover 15, as shown in broken lines in FIG. 2. As shown in FIG. 3, the screw 33 may now be used to secure the warmer station to the cover as well as to secure the cover 15 to the brewing apparatus. More specifically, as shown in FIG. 3, the screw 33 includes an elongated lower threaded portion 37 adapted to be threadedly engaged with a female connector portion 38 formed integrally with upper portion tank 14a. The length of the screw is preselected to extend downwardly through the cover 15 to have the desired threaded engagement with connector 38 in the arrangement of FIG. 2 wherein the warmer station 19 is not installed on the cover 15. However, as shown in broken lines in FIG. 2 and in full lines in FIG. 3, the warmer station may be secured to the cover by the screw 33 which may be extended downwardly through the warmer station bottom wall 28 and cover 15 with the lower portion 37 again having threaded engagement with the connector 38.

As best seen in FIG. 3, warmer station 19 is provided with a plurality of depending legs 39 which space the bottom wall 28 above the upper surface of the cover 15. To provide an improved support for the warmer station, a spacer generally designated 40 may be provided having a head portion 41 staked to the warmer station bottom wall 28 and extending downwardly to the cover 15 so as to be received in an upwardly opening recess 42 extending about the opening 43 in the wall through which the screw threaded portion 36 extends. A spool-shaped guide 44 may be provided in the cover 15 to extend downwardly through opening 43 for passing the screw portion 37 downwardly into engagement with the connector 38.

To further support the cover 15 in the area of the opening 32, the basin 14 may be provided with an upwardly extending tubular wall 45 and the cover may be provided with a complementary downwardly extending tubular wall 46 which may abut at 47 when the cover is installed in overlying relationship with the brewer upper portion 14.

Thus, the warmer station 19 of the present invention is adapted for selective use as an independent warmer station, as shown in FIG. 1 of the drawing, and as a component of the beverage brewing apparatus, as shown in FIG. 2 of the drawing in broken lines. The invention comprehends utilization of securing means for retaining the cover removably on the brewing apparatus, which means are also utilized for retaining the warmer station in overlying relationship to the cover when the arrangement of FIG. 2 is desired.

The foregoing disclosure of specific embodiments is illustrative of the broad inventive concepts comprehended by the invention.

I claim:

1. A beverage brewer structure comprising: a beverage brewing apparatus having a heating tank and top portion defining an upwardly opening basin for conducting water to said tank and having an opening defined by a wall portion thereof; a cover selectively overlying said basin; removable securing means extending through said cover and engaging a connecting portion of the tank for selectively retaining the cover in overlying relationship to said basin; a warmer station having a heater for heating a decanter placed thereon and control means for controlling operation of the heater; and wall means on said warmer station for engagement by said securing means for selectively permitting the warmer station to be used selectively (a) separately from the brewing apparatus, and (b) mounted on said cover and secured thereto by said securing means, as desired, said warmer station wall means comprising a bottom wall thereof and said securing means extending through said basin opening and securing said bottom wall to said tank in closely superposed relationship to said cover.

2. The beverage brewer structure of claim 1 wherein said warmer station includes a separable wall portion overlying said securing means when said warmer station is mounted to said cover.

3. The beverage brewer structure of claim 1 wherein said warmer structure includes a removable cover plate overlying said securing means when said warmer station is mounted to said cover.

4. The beverage brewer structure of claim 1 wherein said brewing apparatus includes an integral base portion defining a warmer station, and said first named warmer station has an exterior configuration substantially similar thereto.

5. The beverage brewer structure of claim 1 wherein said securing means includes a spacer extending between said warmer station wall means and said cover.

6. The beverage brewer structure of claim 1 wherein said connecting portion comprises a female threaded portion and said securing means comprises a male threaded member having a length preselected to engage said female threaded portion suitably to effect securing of the top wall to said apparatus both with and without the warmer station mounted on said top wall.

7. The beverage brewer structure of claim 1 wherein said connecting portion comprises a female threaded portion and said securing means comprises a male threaded member having a length preselected to engage said female threaded portion suitably to effect securing of the top wall to said apparatus both with and without the warmer station mounted on said top wall.

8. The beverage brewer structure of claim 1 wherein said warmer station includes a bottom wall support means extending downwardly from said warmer station to support said warmer station on a subjacent flat surface with the bottom wall spaced above said flat surface, and said securing means includes a downwardly extending spacer carried by said warmer station bottom wall, said securing means further urging said spacer into engagement with said apparatus top wall.

9. The beverage brewer structure of claim 1 wherein said warmer station includes a bottom wall support means extending downwardly from said warmer station to support said warmer station on a subjacent flat surface with the bottom wall spaced above said flat surface, and said securing means includes a spacer disposed between said warmer station bottom wall and said apparatus top wall, said securing means further securing said spacer in said structure, said connecting portion comprising a female threaded portion and said securing means comprising a male threaded member having a length preselected to engage said female threaded portion suitably to effect securing of the top wall to said apparatus both with and without the warmer station mounted on said top wall.

* * * * *